US012058246B2

(12) United States Patent
Endo et al.

(10) Patent No.: US 12,058,246 B2
(45) Date of Patent: Aug. 6, 2024

(54) SECRET KEY SHARING SYSTEM AND SECRET KEY SHARING METHOD

(71) Applicant: NATIONAL INSTITUTE OF INFORMATION AND COMMUNICATIONS TECHNOLOGY, Koganei (JP)

(72) Inventors: Hiroyuki Endo, Tokyo (JP); Masahide Sasaki, Tokyo (JP)

(73) Assignee: NATIONAL INSTITUTE OF INFORMATION AND COMMUNICATIONS TECHNOLOGY, Tokyo (JP)

(*) Notice: Subject to any disclaimer, the term of this patent is extended or adjusted under 35 U.S.C. 154(b) by 236 days.

(21) Appl. No.: 17/791,648

(22) PCT Filed: Jan. 22, 2021

(86) PCT No.: PCT/JP2021/002129
§ 371 (c)(1),
(2) Date: Jul. 8, 2022

(87) PCT Pub. No.: WO2021/153431
PCT Pub. Date: Aug. 5, 2021

(65) Prior Publication Data
US 2023/0022825 A1 Jan. 26, 2023

(30) Foreign Application Priority Data
Jan. 29, 2020 (JP) ................................. 2020-012325

(51) Int. Cl.
*H04L 9/08* (2006.01)
(52) U.S. Cl.
CPC ............ *H04L 9/085* (2013.01); *H04L 9/0869* (2013.01)

(58) Field of Classification Search
CPC .............................. H04L 9/085; H04L 9/0869
See application file for complete search history.

(56) References Cited

U.S. PATENT DOCUMENTS 8,559,642 B2 * 10/2013 Wurm ................... H04L 9/0841
380/278
10,372,528 B1 * 8/2019 Anderson ............... G06F 21/00
(Continued)

FOREIGN PATENT DOCUMENTS

| JP | 2017055335 A | 3/2017 |
| JP | 2018074253 A | 5/2018 |

OTHER PUBLICATIONS

International Search Report (ISR) dated Apr. 13, 2021, issued in International Application No. PCT/JP2021/002129.
(Continued)

*Primary Examiner* — Chau Le
(74) *Attorney, Agent, or Firm* — Holtz, Holtz & Volek PC (57) ABSTRACT

A secret key sharing system includes a transceiver in a first layer, a plurality of transceivers in a second layer, and a plurality of transceivers in a third layer. The transceivers in the second layer receive a first random number from the transceiver in the first layer via a directional carrier wave. The transceivers in the third layer receive a second random number from one of the transceivers in the second layer via the carrier wave. The transceiver in the first layer and the transceivers in the second layer share a first secret key based on the first random number, and the one of the transceivers in the second layer and the plurality of transceivers in the third layer share a second secret key based on the second random number.

5 Claims, 7 Drawing Sheets

(56) References Cited

U.S. PATENT DOCUMENTS

| | | | |
|---|---|---|---|
| 11,212,089 B2* | 12/2021 | Khandani | H04L 9/3273 |
| 11,394,537 B2* | 7/2022 | Toudeh-Fallah | H04L 63/0478 |
| 11,442,180 B2* | 9/2022 | Shin | H04W 12/104 |
| 2017/0264433 A1* | 9/2017 | Tanizawa | H04L 9/0858 |
| 2020/0110906 A1* | 4/2020 | Choi | G06F 21/70 |

OTHER PUBLICATIONS

Written Opinion dated Apr. 13, 2021, issued in International Application No. PCT/JP2021/002129.

Toyoshima, et al., "Research and Development of Space Quantum Cryptography Communications in Japan", IEICE Technical Report, vol. 106, No. 104, pp. 25-28, Jun. 9, 2006, ISSN 0913-5685.

* cited by examiner

SECRET KEY SHARING SYSTEM AND SECRET KEY SHARING METHOD

TECHNICAL FIELD

Embodiments of the present invention relate to a secret key sharing system and a secret key sharing method.

BACKGROUND ART

A cryptographic communication with information-theoretic security is used in, for example, a secret key sharing system disclosed in Patent Document 1. Here, a cipher satisfying the information-theoretic security has a feature that "any decoding result obtained by any key is equally possible," and the examples of the cipher include a cipher having a plaintext size equal to or less than a key size, such as a one-time pad cipher included in a Vernam cipher. As another expression, it can be said to be a feature that the cipher satisfying the information-theoretic security is unbreakable by any computer.

Patent Document 1: JP-A-2018-074253

DISCLOSURE OF THE INVENTION

Problems to be Solved by the Invention

However, in the conventional system using the cryptographic communication having the information-theoretic security as disclosed in Patent Document 1, a key distillation process is collectively performed only once. Therefore, the conventional system using the cryptographic communication having the information-theoretic security as disclosed in Patent Document 1 has a feature in which sizes of secret keys included in respective nodes are small compared with a case where the key distillation process is performed multiple times. In the conventional system using the cryptographic communication having the information-theoretic security as disclosed in Patent Document 1, it is necessary to perform a communication between a top node and a bottom node.

Therefore, it can be said that the conventional system using the cryptographic communication having the information-theoretic security as disclosed in Patent Document 1 lacks efficiency due to loads on communication terminals included in the respective nodes. It can be said that the conventional system using the cryptographic communication having the information-theoretic security as disclosed in Patent Document 1 lacks scalability due to a complicated control procedure of the system.

Thus, the conventional system using the cryptographic communication having the information-theoretic security as disclosed in Patent Document 1 has a problem of the lack of the efficiency and the scalability.

Embodiments of the present invention have an object to provide a secret key sharing system having the efficiency and the scalability and having the information-theoretic security.

Solutions to the Problems

There is provided a secret key sharing system including a transceiver in a first layer, a plurality of transceivers in a second layer, and a plurality of transceivers in a third layer. The plurality of transceivers in the second layer receive a first random number from the transceiver in the first layer via a directional carrier wave. The plurality of transceivers in the third layer receive a second random number from one transceiver of the plurality of transceivers in the second layer via the directional carrier wave. The transceiver in the first layer and the plurality of transceivers in the second layer share a first secret key based on the first random number, and the one transceiver of the plurality of transceivers in the second layer and the plurality of transceivers in the third layer share a second secret key based on the second random number. The plurality of transceivers in the third layer receive a calculated value by an exclusive OR of the first secret key and the second secret key from the one transceiver of the plurality of transceivers in the second layer via a public communication path as a communication path open to public, and calculate the first secret key by obtaining an exclusive OR of the received calculated value and the second secret key. The first secret key and the second secret key are generated by respectively referring to a first bit error rate and a second bit error rate of the first random number and the second random number carried via the carrier wave, a first leaked information amount and a second leaked information amount, first correction information and second correction information, and a first compression ratio and a second compression ratio. The first bit error rate and the second bit error rate are transmitted and received via the public communication path. The first leaked information amount and the second leaked information amount are amounts of the first random number and the second random number leaked from the carrier wave. The first correction information and the second correction information are for correcting errors of the first random number and the second random number carried via the carrier wave. The first compression ratio and the second compression ratio are ratios for compressing the first random number and the second random number.

There is provided a secret key sharing method that includes: a key distillation step including: a parameter estimation step of calculating a first bit error rate and a second bit error rate and a first leaked information amount and a second leaked information amount, the first bit error rate and the second bit error rate being bit error rates of a first random number in a first layer and a second random number in a second layer carried via a directional carrier wave, the first leaked information amount and the second leaked information amount being amounts of the first random number and the second random number leaked from the carrier wave; an information reconciliation step of generating first correction information and second correction information for correcting errors of the first random number and the second random number carried via the carrier wave and correcting the first random number and the second random number carried via the carrier wave by the first correction information and the second correction information; and a privacy amplification step of compressing the first random number and the second random number carried via the carrier wave, and generating a first secret key and a second secret key from the first random number and the second random number carried via the carrier wave; and a key encapsulation relay step of receiving a calculated value by an exclusive OR of the first secret key and the second secret key via a public communication path as a communication path open to public, and calculating the first secret key by obtaining an exclusive OR of the received calculated value and the second secret key in the second layer.

Effects of the Invention

According to the present invention, a secret key sharing system having an efficiency and a scalability and having an information-theoretic security can be achieved.

DESCRIPTION OF PREFERRED EMBODIMENTS

The following describes one aspect of an embodiment of the present invention in detail.

Figure 1:
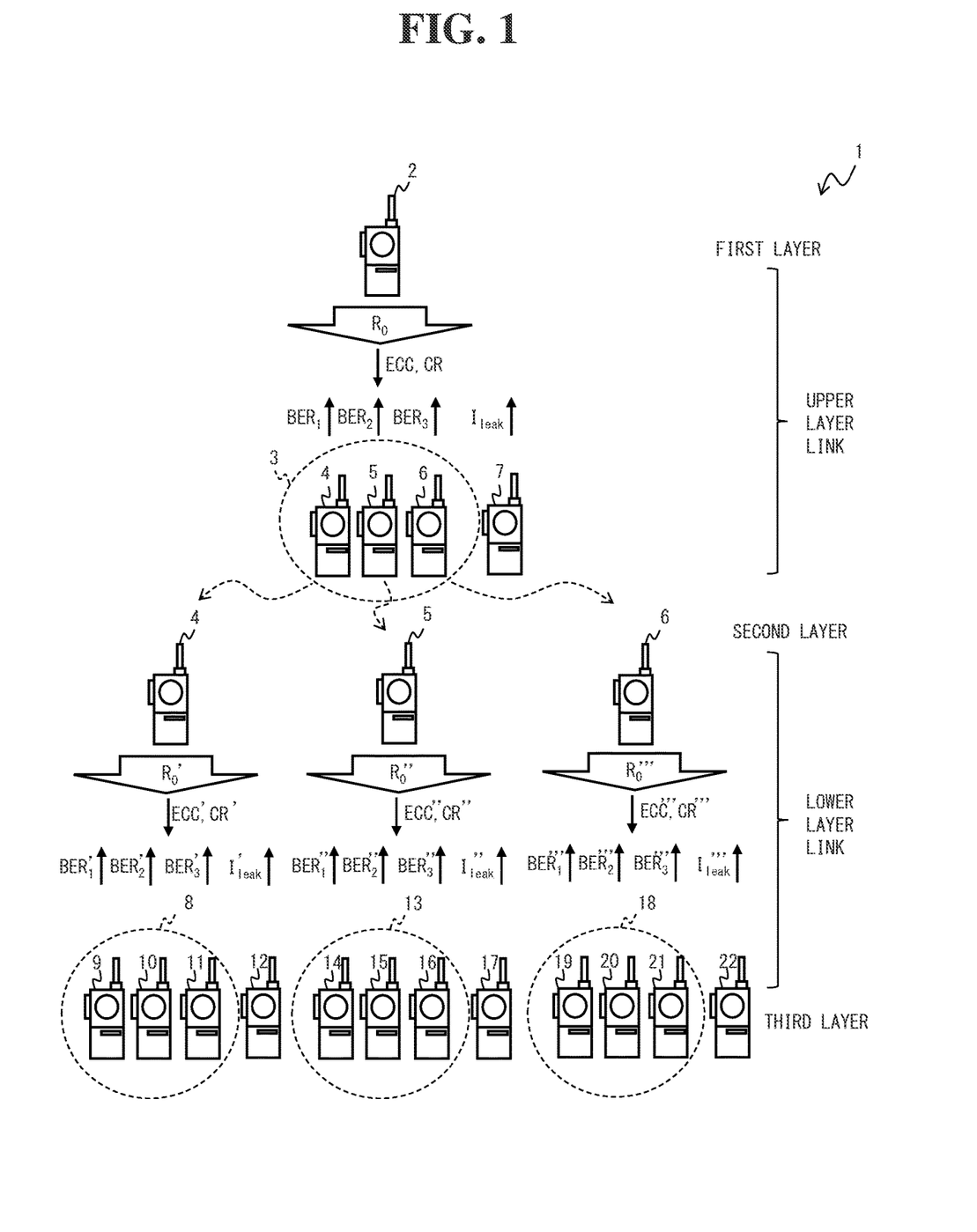
FIG. 1 is a schematic diagram illustrating a configuration of a secret key sharing system according to an embodiment.

FIG. 1 is a schematic diagram illustrating a configuration of a secret key sharing system 1 according to the embodiment. As illustrated in FIG. 1, the secret key sharing system 1 includes a transceiver 2 in a first layer, a plurality of transceivers 4, 5, 6 in a second layer that receive a first random number $R_0$ from the transceiver 2 in the first layer via a directional carrier wave (hereinafter, this may be simply referred to as a carrier wave), and a plurality of transceivers 9, 10, 11 in a third layer that receive a second random number $R_0'$ from the transceiver 4 as one of the plurality of transceivers 4, 5, 6 in the second layer via a carrier wave.

The secret key sharing system 1 includes a plurality of transceivers 14, 15, 16 in the third layer that receive a third random number $R_0''$ from the transceiver 5 as one of the plurality of transceivers 4, 5, 6 in the second layer via a carrier wave.

The secret key sharing system 1 includes a plurality of transceivers 19, 20, 21 in the third layer that receive a fourth random number $R_0'''$ from the transceiver 6 as one of the plurality of transceivers 4, 5, 6 in the second layer via a carrier wave. The first random number $R_0$, the second random number $R_0'$, the third random number $R_0''$, and the fourth random number $R_0'''$ each include a bit string including a plurality of bits.

The transceivers 4, 5, 6 constitute a group 3. For example, the group 3 includes the transceivers 4, 5, 6 in a physically separated section. The separated section is, for example, in a predetermined range monitored by a monitoring unit 36 described below included in each of the transceivers 4, 5, 6.

Similarly, the transceivers 9, 10, 11 constitute a group 8. For example, the group 8 includes the transceivers 9, 10, 11 in a separated section. The separated section is, for example, in a predetermined range monitored by a monitoring unit 36 included in each of the transceivers 9, 10, 11.

Similarly, the transceivers 14, 15, 16 constitute a group 13. For example, the group 13 includes the transceivers 14, 15, 16 in a separated section. The separated section is, for example, in a predetermined range monitored by a monitoring unit 36 included in each of the transceivers 14, 15, 16.

Similarly, the transceivers 19, 20, 21 constitute a group 18. For example, the group 18 includes the transceivers 19, 20, 21 in a separated section. The separated section is, for example, in a predetermined range monitored by a monitoring unit 36 included in each of the transceivers 19, 20, 21.

A transceiver 7 (hereinafter, this may be referred to as an out-of-range transceiver) is provided, for example, outside the separated section in which the group 3 is formed so as to be adjacent to the section. A first leaked information amount $I_{leak}$ described below is calculated by the transceiver 7. Similarly, transceivers 12, 17, 22 are respectively provided, for example, outside the separated sections in which the groups 8, 13, 18 are formed so as to be adjacent to the sections.

A connection between the first layer and the second layer is referred to as an upper layer link, and a connection between the second layer and the third layer is referred to as a lower layer link. The connection between the first layer and the second layer specifically means a connection between the transceiver 2 and the transceivers 4 to 6. The connection between the second layer and the third layer specifically means, for example, a connection between the transceiver 4 and the transceivers 9 to 11.

The transceiver 2 may be referred to as Alice with a meaning of transmitting side. The transceivers 4, 5, 6 may be referred to as Bob with a meaning of receiving side. The transceivers 9 to 11, 14 to 16, and 19 to 21 may be referred to as Charlie with a meaning of third party. The transceivers 7, 12, 17, 22 may be virtually referred to as virtual Eve with a meaning of device performing a passive attack such as eavesdropping. It can be said that the transceivers 7, 12, 17, 22 establish a probe communication path by the virtual attack.

Figure 2:
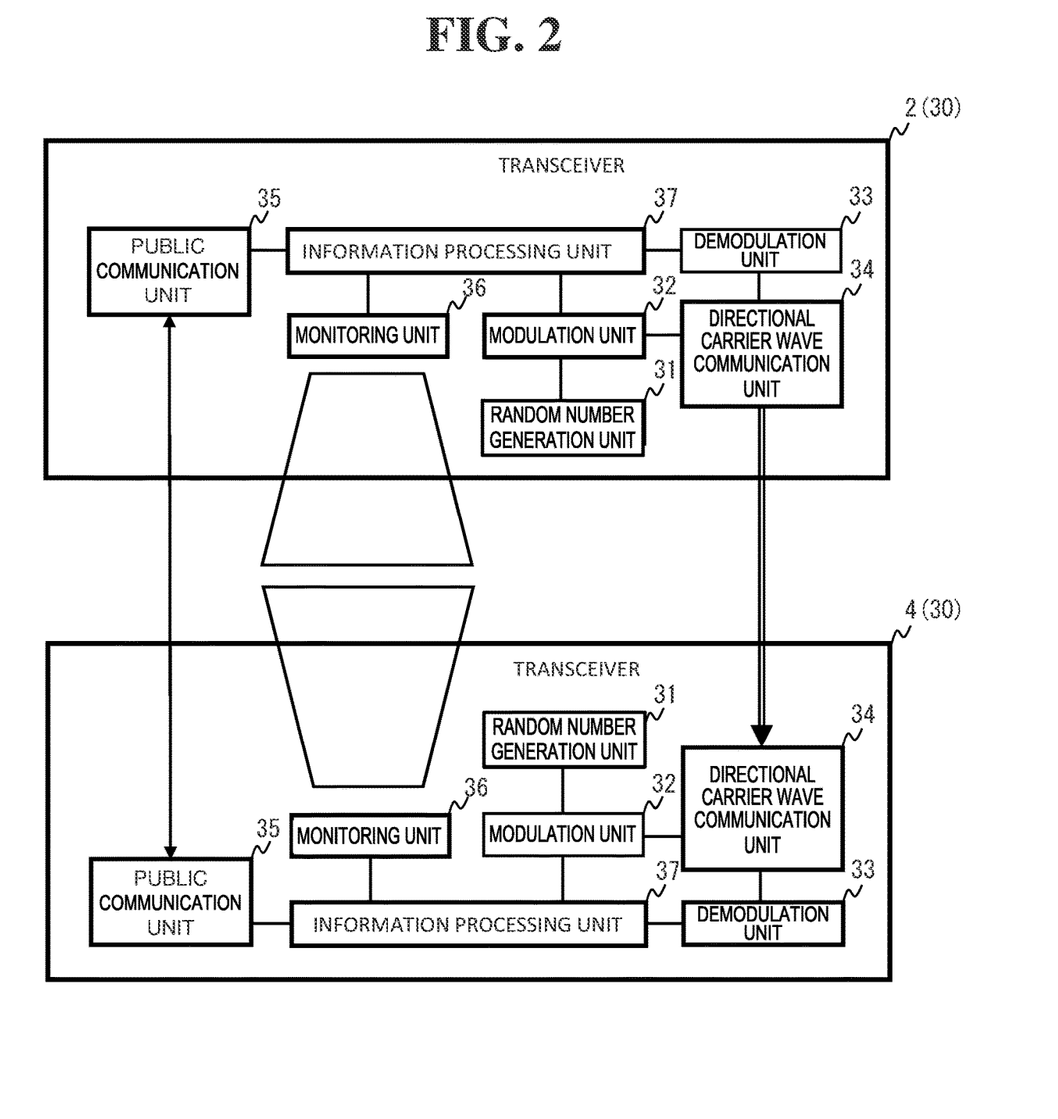
FIG. 2 is a block diagram illustrating a configuration of a transceiver according to the embodiment.

Here, with reference to FIG. 2 as a block diagram illustrating a configuration of a transceiver 30 according to the embodiment, block configurations of the transceivers 2, 4 to 7, 9 to 12, 14 to 17, and 19 to 22 will be described. Since the transceivers 2, 4 to 7, 9 to 12, 14 to 17, and 19 to 22 have the same configuration, they are described as the transceiver 30. The description will be given specifically with an example of the connection between the transceiver 2 as the transmitting side of the carrier wave and the transceiver 4 as the receiving side of the carrier wave in the upper layer link.

The transceiver 30 includes a random number generation unit 31, a modulation unit 32, a demodulation unit 33, a directional carrier wave communication unit 34, a public communication unit 35, a monitoring unit 36, and an information processing unit 37.

The random number generation unit 31 and the information processing unit 37 are implemented as an integrated circuit or the like. The modulation unit 32, the demodulation unit 33, and the directional carrier wave communication unit 34 are devices carrying a carrier wave of light or millimeter wave formed in a beam shape, and for example, a Free Space Optics (FSO) device or a Visible Light Communication (VLC) device.

The public communication unit 35 is, for example, a Very High Frequency (VHF) communication device or an Ultra High Frequency (UHF) communication device. The monitoring unit 36 is a monitoring camera or the like.

The random number generation unit 31 generates a random number, for example, when the transceiver 30 is the transmitting side of the carrier wave like the transceiver 2. The modulation unit 32 modulates the random number generated by the random number generation unit 31, for example, when the transceiver 30 is the transmitting side of the carrier wave like the transceiver 2. The demodulation unit 33 demodulates the modulated random number, for example, when the transceiver 30 is the receiving side of the carrier wave like the transceiver 4.

The directional carrier wave communication unit 34 transmits and receives the modulated random number. The public communication unit 35 performs a communication using a public communication path. The monitoring unit 36 monitors a predetermined range, such as a viewable range, based on the transceiver 30.

The information processing unit 37 processes information. Specifically, the information processing unit 37 performs a key distillation process including a parameter estimation process, an information reconciliation process, and a privacy amplification process, and a key encapsulation relay process, which are described below.

The explanation is continued by referring again to FIG. 1. The transceiver 2 in the first layer and the plurality of transceivers 4, 5, 6 in the second layer share a first secret key $K_0$ based on the first random number $R_0$, and the transceiver 4 as one of the plurality of transceivers 4, 5, 6 in the second layer and the plurality of transceivers 9, 10, 11 in the third layer share a second secret key $K_1$ based on the second random number $R_0'$.

The transceiver 5 as one of the plurality of transceivers 4, 5, 6 in the second layer and the plurality of transceivers 14, 15, 16 in the third layer share a third secret key $K_2$ based on the third random number $R_0''$. The transceiver 6 as one of the plurality of transceivers 4, 5, 6 in the second layer and the plurality of transceivers 19, 20, 21 in the third layer share a fourth secret key $K_3$ based on the fourth random number $R_0'''$.

The plurality of transceivers 9, 10, 11 in the third layer receive a calculated value by an exclusive OR of the first secret key $K_0$ and the second secret key $K_1$ from the transceiver 4 as one of the plurality of transceivers 4, 5, 6 in the second layer via the public communication path as a communication path open to public. The plurality of transceivers 9, 10, 11 in the third layer obtain an exclusive OR of the received calculated value and the second secret key $K_1$, thereby calculating the first secret key $K_0$.

The plurality of transceivers 14, 15, 16 in the third layer receive a calculated value by an exclusive OR of the first secret key $K_0$ and the third secret key $K_2$ from the transceiver 5 as one of the plurality of transceivers 4, 5, 6 in the second layer via the public communication path as a communication path open to public. The plurality of transceivers 14, 15, 16 in the third layer obtain an exclusive OR of the received calculated value and the third secret key $K_2$, thereby calculating the first secret key $K_0$.

The plurality of transceivers 19, 20, 21 in the third layer receive a calculated value by an exclusive OR of the first secret key $K_0$ and the fourth secret key $K_3$ from the transceiver 6 as one of the plurality of transceivers 4, 5, 6 in the second layer via the public communication path as a communication path open to public. The plurality of transceivers 19, 20, 21 in the third layer obtain an exclusive OR of the received calculated value and the third secret key $K_2$, thereby calculating the first secret key $K_0$.

The first secret key $K_0$ is generated by referring to first bit error rates $BER_1$, $BER_2$, $BER_3$, a first leaked information amount $I_{leak}$, first correction information ECC, and a first compression ratio CR. The second secret key $K_1$ is generated by referring to second bit error rates $BER_1'$, $BER_2'$, $BER_3'$, a second leaked information amount Leak, second correction information ECC', and a second compression ratio CR'.

The first bit error rates $BER_1$, $BER_2$, $BER_3$ are values of estimating an error rate of bits of the first random number $R_0$ carried via the carrier wave, and transmitted and received via the public communication path. The second bit error rates $BER_1'$, $BER_2'$, $BER_3'$ are error rates of bits of the second random number $R_0'$ carried via the carrier wave, and transmitted and received via the public communication path.

The first bit error rates $BER_1$, $BER_2$, $BER_3$ and the second bit error rates $BER_1'$, $BER_2'$, $BER_3'$ are the rates of error bits in all of the bits, and have values in a range from 0 to 0.5.

The first leaked information amount $I_{leak}$ is a value of estimating an amount of the first random number $R_0$ leaked from the carrier wave, and transmitted and received via the public communication path. The second leaked information amount $I_{leak}'$ is an amount of the second random number $R_0'$ leaked from the carrier wave, and transmitted and received via the public communication path. The leaked information amount, such as the first leaked information amount $I_{leak}$ and the second leaked information amount $I_{leak}'$, indicates the amount of information, and indicates, for example, the number of bits.

The first correction information ECC is information for correcting the error of the first random number $R_0$ carried via the carrier wave, and transmitted and received via the public communication path. The second correction information ECC' is information for correcting the error of the second random number $R_0'$ carried via the carrier wave, and transmitted and received via the public communication path.

The first compression ratio CR is a ratio for compressing the first random number $R_0$, and transmitted and received via the public communication path. The second compression ratio CR' is a ratio for compressing the second random number $R_0'$, and transmitted and received via the public communication path. The first compression ratio CR and the second compression ratio CR' are the ratios of the bit numbers of the first secret key $K_0$ and the second secret key $K_1$ to the bit numbers of the first random number $R_0$ and the second random number $R_0'$, and have values in a range from 0 to 1.

Since the third secret key $K_2$, the third random number $R_0''$, the third bit error rates $BER_1''$, $BER_2''$, $BER_3''$, the third leaked information amount $I_{leak}''$, the third correction information ECC'', and the third compression ratio CR' are similar to the first secret key $K_0$, the first random number $R_0$, the first bit error rates $BER_1$, $BER_2$, $BER_3$, the first leaked information amount $I_{leak}$, the first correction information ECC, and the first compression ratio CR, the explanations are omitted.

Since the fourth secret key $K_3$, the fourth random number $R_0'''$, the fourth bit error rates $BER_1'''$, $BER_2'''$, $BER_3'''$, the fourth leaked information amount $I_{leak}'$, the fourth correction information ECC''', and the fourth compression ratio CR''' are similar to the first secret key $K_0$, the first random number $R_0$, the first bit error rates $BER_1$, $BER_2$, $BER_3$, the first leaked information amount $I_{leak}$, the first correction information ECC, and the first compression ratio CR, the explanations are omitted.

Next, with reference to FIG. 3 as a sequence diagram for describing a key distillation function according to the embodiment, the key distillation function achieved by a key distillation process will be described. The key distillation function includes a parameter estimation function achieved by a parameter estimation process, an information reconciliation function achieved by an information reconciliation process, and a privacy amplification function achieved by a privacy amplification process. Here, the explanation will be given with an example of the upper layer link.

The transceiver 2 transmits the first random number $R_0$ as a base of the first secret key $K_0$ to the transceivers 4 to 7 via the carrier wave (S1 to S4). The transceivers 4 to 7 receive the first random number $R_0$ carried via the carrier wave as the carried random numbers $R_1$ to $R_4$.

The transceiver 2 transmits a test bit $T_{bit}$ and a test bit address $T_{addr}$ to the transceivers 4 to 7 via the public communication path (S5 to S8). The test bit $T_{bit}$ includes a plurality of bits randomly extracted from the first random number $R_0$. The test bit address $T_{addr}$ includes addresses in the first random number $R_0$ of the respective plurality of bits randomly extracted from the first random number $R_0$.

The transceivers 4 to 6 calculate the first bit error rates $BER_1$, $BER_2$, $BER_3$ using the carried random numbers $R_1$ to $R_3$, the test bit $T_{bit}$, and the test bit address $T_{addr}$. The transceivers 4 to 6 transmit the calculated first bit error rates $BER_1$, $BER_2$, $BER_3$ to the transceiver 2 (S9 to S11).

The transceiver 7 calculates the first leaked information amount $I_{leak}$ using the carried random number $R_4$, the test bit $T_{bit}$, and the test bit address $T_{addr}$. The transceiver 7 transmits the calculated first leaked information amount $I_{leak}$ to the transceiver 2 (S12).

Thus, the secret key sharing system 1 achieves the parameter estimation function as a function of estimating the parameters, such as the first bit error rates $BER_1$, $BER_2$, $BER_3$ and the first leaked information amount $I_{leak}$, by, for example, Steps S1 to S12.

The transceiver 2 generates the first correction information ECC based on the first bit error rates $BER_1$, $BER_2$, $BER_3$ received from the transceivers 4 to 7. The higher the bit error rate is, the more the information amount of the first correction information ECC increases. For example, the transceiver 2 generates the first correction information ECC using a linear error correcting code or the like. The linear error correcting code means, for example, a low density parity check (LDPC) code.

The transceiver 2 transmits the generated first correction information ECC to the transceivers 4 to 6 (S13 to S15). The transceivers 4 to 6 correct the carried random numbers $R_1$ to $R_3$ so as to approach the first random number $R_0$ using the received first correction information ECC, and generate corrected random numbers $R_{1c}$ to $R_{3c}$.

Thus, the secret key sharing system 1 achieves the information reconciliation function as a function of reconciling the information by, for example, Steps S13 to S15. Specifically, the secret key sharing system 1 reconciles the information by correcting the carried random numbers $R_1$ to $R_3$ so as to approach the first random number $R_0$.

The transceiver 2 calculates the first compression ratio CR from the first leaked information amount $I_{leak}$ and the first correction information ECC. The transceiver 2 transmits the calculated first compression ratio CR to the transceivers 4 to 6 (S16 to S18). The transceiver 2 compresses the first random number $R_0$ by the calculated first compression ratio CR using a hash function, thereby generating the first secret key $K_0$. The transceivers 4 to 6 compress the corrected random numbers $R_{1c}$ to $R_{3c}$ by the received first compression ratio CR using a hash function, thereby generating the first secret key $K_0$.

Thus, the secret key sharing system 1 achieves the privacy amplification function as a function of amplifying the privacy by, for example, Steps S16 to S18. Specifically, the secret key sharing system 1 amplifies the privacy by deleting the information amount to be possibly leaked by the compression using the hash function.

Figure 3:
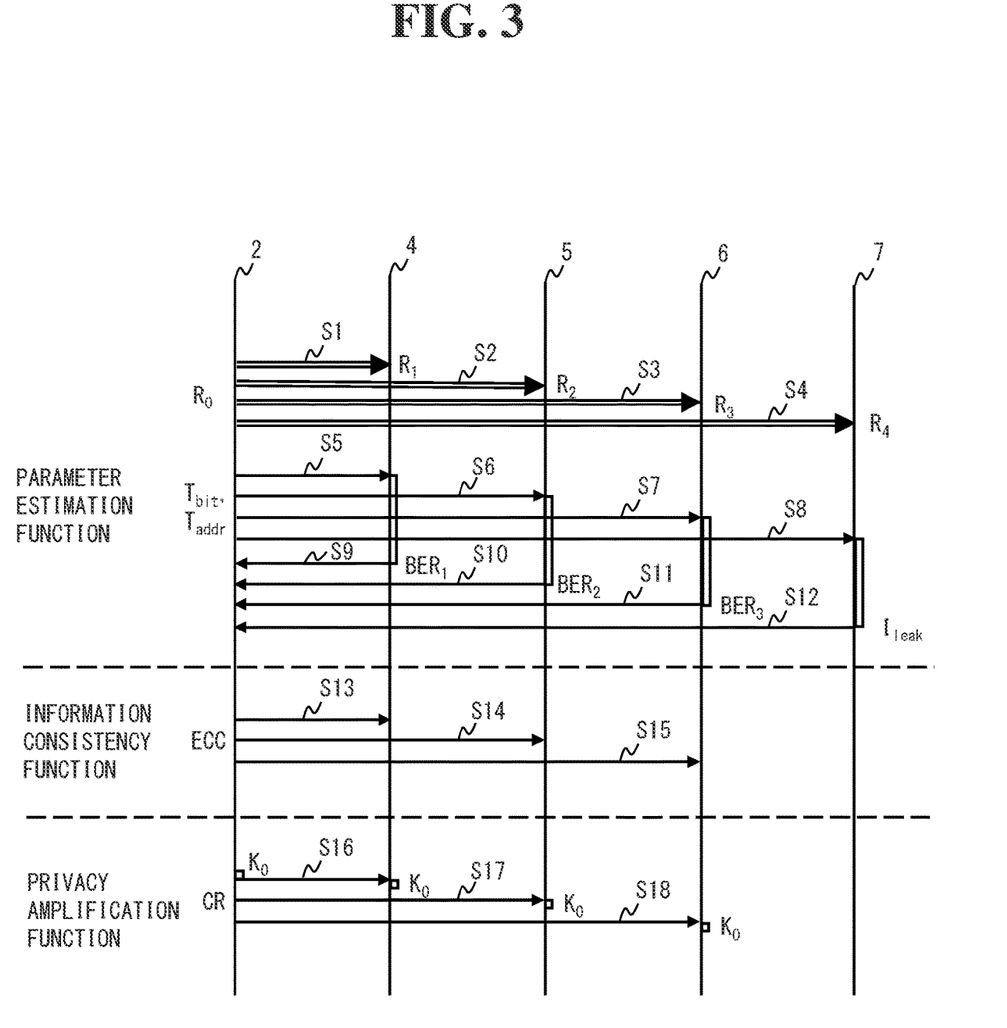
FIG. 3 is a sequence diagram for describing a key distillation function according to the embodiment.

While FIG. 3 describes the generation of the first secret key $K_0$, the second secret key $K_1$, the third secret key $K_2$, and the fourth secret key $K_3$ are generated similarly. For example, in the generation of the second secret key $K_1$, the transceiver 4 corresponds to the transceiver 2 in the generation of the first secret key $K_0$, and the group 8 corresponds to the group 3 in the generation of the first secret key $K_0$.

Next, with reference to FIG. 4 as a conceptual diagram for describing a key encapsulation relay function according to the embodiment, the key encapsulation relay function achieved by the key encapsulation relay process will be described. A first phase in FIG. 4 means before the key encapsulation relay process, and a second phase in FIG. 4 means after the key encapsulation relay process.

Figure 4:
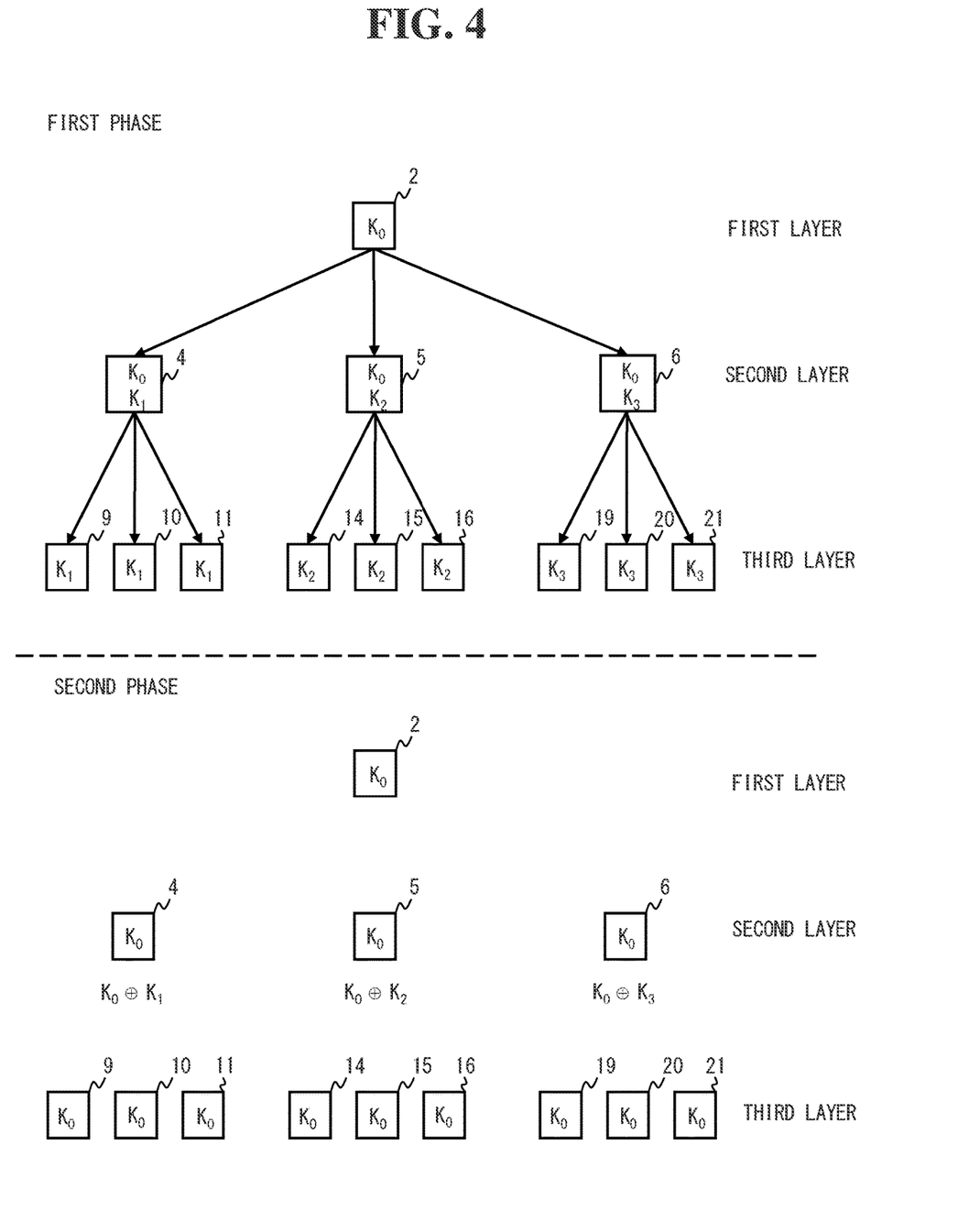
FIG. 4 is a conceptual diagram for describing a key encapsulation relay function according to the embodiment.

As illustrated in the first phase in FIG. 4, the transceiver 4 is connected to the transceivers 9 to 11 of the group 8 positioned at a position apart from the position at which the first secret key $K_0$ is generated by moving while holding the first secret key $K_0$, and this allows the generation of the second secret key $K_1$.

The transceiver 5 is connected to the transceivers 14 to 16 of the group 13 positioned at a position apart from the position at which the first secret key $K_0$ is generated by moving while holding the first secret key $K_0$, and this allows the generation of the third secret key $K_2$.

The transceiver 6 is connected to the transceivers 19 to 21 of the group 18 positioned at a position apart from the position at which the first secret key $K_0$ is generated by moving while holding the first secret key $K_0$, and this allows the generation of the fourth secret key $K_3$.

Thus, performing the key distillation process multiple times allows establishing the connection between the transceivers 2, 4, 5, 6 with a tree structure as illustrated in the first phase in FIG. 4.

In the tree structure, specifically, the transceiver 2 as a parent node in the first layer is connected to the transceivers 4 to 6 as child nodes in the second layer by sharing the first secret key $K_0$. The transceiver 4 as a child node in the second layer is connected to the transceivers 9 to 11 as grandchild nodes in the third layer by sharing the second secret key $K_1$.

The transceiver 5 as a child node in the second layer is connected to the transceivers 14 to 16 as grandchild nodes in the third layer by sharing the third secret key $K_2$. The transceiver 6 as a child node in the second layer is connected to the transceivers 19 to 21 as grandchild nodes in the third layer by sharing the fourth secret key $K_3$.

When the tree structure is built, the first secret key $K_0$ held by the transceiver 2 is encapsulated by the operation of the exclusive OR as illustrated in the second phase in FIG. 4, and delivered to the transceivers 9 to 11, 14 to 16, and 19 to 21 like a relay.

Specifically, from the transceiver 4 to the transceivers 9 to 11, the first secret key $K_0$ encapsulated by the second secret key $K_1$ is transmitted. In other words, from the transceiver 4 to the transceivers 9 to 11, a calculated value $K_0 \text{XOR} K_1$ of the exclusive OR of the first secret key $K_0$ and the second secret key $K_1$ is transmitted. The transceiver 4 deletes the second secret key $K_1$ after transmitting the calculated value $K_0 \text{XOR} K_1$.

Similarly, from the transceiver 5 to the transceivers 14 to 16, the first secret key $K_0$ encapsulated by the third secret key $K_2$ is transmitted. In other words, from the transceiver 5 to the transceivers 14 to 16, a calculated value $K_0 \text{XOR} K_2$ of the exclusive OR of the first secret key $K_0$ and the third secret key $K_2$ is transmitted. The transceiver 5 deletes the third secret key $K_2$ after transmitting the calculated value $K_0 \text{XOR} K_2$.

Similarly, from the transceiver 6 to the transceivers 19 to 21, the first secret key $K_0$ encapsulated by the fourth secret key $K_3$ is transmitted. In other words, from the transceiver 6 to the transceivers 14 to 16, a calculated value $K_0 XOR K_3$ of the exclusive OR of the first secret key $K_0$ and the fourth secret key $K_3$ is transmitted. The transceiver 6 deletes the fourth secret key $K_3$ after transmitting the calculated value $K_0 XOR K_3$.

When receiving the calculated value $K_0 XOR K_1$, the transceivers 9 to 11 calculate the first secret key $K_0$ as the exclusive OR of the second secret key $K_1$ and the calculated value $K_0 XOR K_1$. Similarly, when receiving the calculated value $K_0 XOR K_2$, the transceivers 14 to 16 calculate the first secret key $K_0$ as the exclusive OR of the third secret key $K_2$ and the calculated value $K_0 XOR K_2$. Similarly, when receiving the calculated value $K_0 XOR K_3$, the transceivers 19 to 21 calculate the first secret key $K_0$ as the exclusive OR of the fourth secret key $K_3$ and the calculated value $K_0 XOR K_3$.

As described above, the transceivers 2, 4 to 6, 9 to 11, 14 to 16, and 19 to 21 can share the first secret key $K_0$. Thus, since the first secret key $K_0$ is shared through the key distillation process performed multiple times in the embodiment, erroneous information and information to be possibly leaked are not accumulated. When the key distillation process is performed only once as a conventional one, since the same random number is transmitted across the layers, erroneous information and information to be possibly leaked are accumulated for each layer of the first layer, the second layer, and the like.

Figure 5:
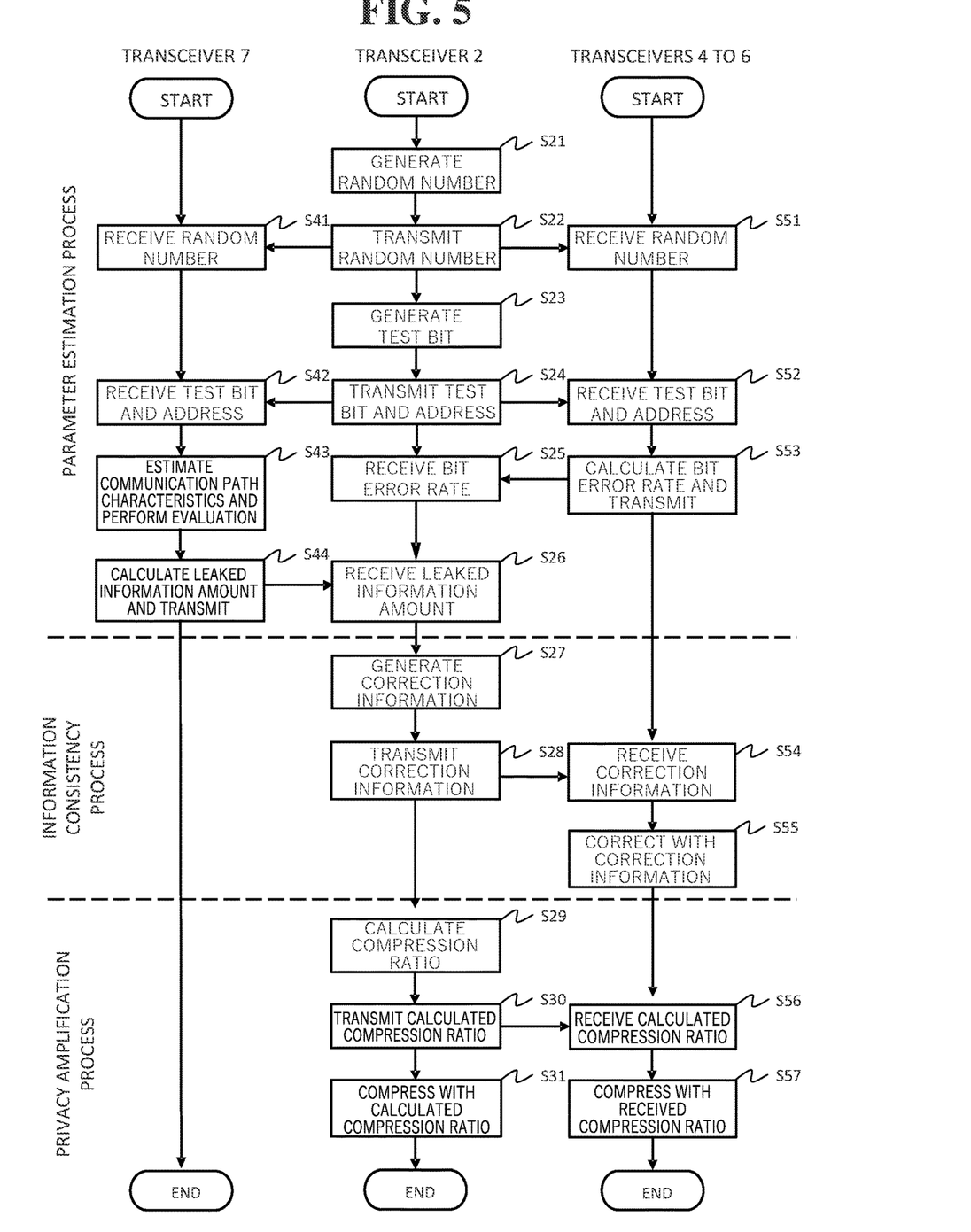
FIG. 5 is a flowchart illustrating a procedure of a key distillation process according to the embodiment.

Next, with reference to FIG. 5 as a flowchart illustrating a procedure of the key distillation process according to the embodiment, the key distillation process will be described. First, the random number generation unit 31 of the transceiver 2 generates the first random number $R_0$ (S21).

The modulation unit 32 of the transceiver 2 modulates the first random number $R_0$ generated by the random number generation unit 31 of the transceiver 2. The directional carrier wave communication unit 34 of the transceiver 2 transmits the first random number $R_0$ modulated by the modulation unit 32 of the transceiver 2 to the directional carrier wave communication unit 34 of the transceiver 4 and the directional carrier wave communication unit 34 of the transceiver 7 (S22).

The information processing unit 37 of the transceiver 2 randomly extracts a plurality of bits from the first random number $R_0$, and generates the test bit $T_{bit}$ (S23). The public communication unit 35 of the transceiver 2 transmits the test bit $T_{bit}$ and the test bit address $T_{addr}$ to the public communication unit 35 of the transceiver 4 and the public communication unit 35 of the transceiver 7 (S24).

The processes in the transceiver 7 will be described. The transceiver 7 relates to the parameter estimation process. First, the directional carrier wave communication unit 34 of the transceiver 7 receives the first random number $R_0$ modulated by the modulation unit 32 of the transceiver 2 from the directional carrier wave communication unit 34 of the transceiver 2 (S41). The demodulation unit 33 of the transceiver 7 demodulates the modulated first random number $R_0$ received by the directional carrier wave communication unit 34 of the transceiver 7.

The public communication unit 35 of the transceiver 7 receives the test bit $T_{bit}$ and the test bit address $T_{addr}$ (S42). The information processing unit 37 of the transceiver 7 obtains a conditional probability from the first random number $R_0$ demodulated by the demodulation unit 33 of the transceiver 7 and the test bit $T_{bit}$ and the test bit address $T_{addr}$ received by the public communication unit 35 of the transceiver 7, thereby estimating communication path characteristics of the communication via the carrier wave.

The information processing unit 37 of the transceiver 7 compares the estimated communication path characteristics with the communication path characteristics estimated in the past, thereby evaluating the communication path characteristics of the communication via the carrier wave (S43). The information processing unit 37 of the transceiver 7 calculates the first leaked information amount $I_{leak}$ based on the evaluation of the communication path characteristics. The public communication unit 35 of the transceiver 7 transmits the calculated first leaked information amount $I_{leak}$ to the public communication unit 35 of the transceiver 2 (S44). When the processes from Steps S41 to S44 end, the transceiver 7 ends the process.

The parameter estimation process in the transceiver 4 will be described. First, the directional carrier wave communication unit 34 of the transceiver 4 receives the first random number $R_0$ modulated by the modulation unit 32 of the transceiver 2 from the directional carrier wave communication unit 34 of the transceiver 2 (S51). The demodulation unit 33 of the transceiver 4 demodulates the modulated first random number $R_0$ received by the directional carrier wave communication unit 34 of the transceiver 4.

The public communication unit 35 of the transceiver 4 receives the test bit $T_{bit}$ and the test bit address $T_{addr}$ (S52). The information processing unit 37 of the transceiver 4 calculates the first bit error rate $BER_1$ from the first random number $R_0$ demodulated by the demodulation unit 33 of the transceiver 4 and the test bit $T_{bit}$ and the test bit address $T_{addr}$ received by the public communication unit 35 of the transceiver 4. The public communication unit 35 of the transceiver 4 transmits the calculated first bit error rate $BER_1$ to the public communication unit 35 of the transceiver 2 (S53). When the processes from Steps S51 to S53 end, the transceiver 4 ends the parameter estimation process.

Similarly to the transceiver 4, the information processing units 37 of the transceivers 5, 6 calculate the first bit error rates $BER_2$, $BER_3$ from the test bit $T_{bit}$ and the test bit address $T_{addr}$. The public communication units 35 of the transceivers 5, 6 transmit the first bit error rates $BER_2$, $BER_3$ to the public communication unit 35 of the transceiver 2.

The description will be continued for the transceiver 2 again. The public communication unit 35 of the transceiver 2 receives the first bit error rates $BER_1$, $BER_2$, $BER_3$ from the public communication units 35 of the transceivers 4, 5, 6 (S25).

The public communication unit 35 of the transceiver 2 receives the first leaked information amount $I_{leak}$ from the public communication unit 35 of the transceiver 7 (S26). The transceiver 2 ends the parameter estimation process when Steps S21 to S26 end, and starts the information reconciliation process.

As the information reconciliation process in the transceiver 2, the information processing unit 37 of the transceiver 2 generates the first correction information ECC, for example, corresponding to the highest bit error rate among the first bit error rates $BER_1$, $BER_2$, $BER_3$ received from the transceivers 4 to 7 (S27). The public communication unit 35 of the transceiver 2 transmits the generated first correction information ECC to the public communication units 35 of the transceivers 4, 5, 6 (S28). The transceiver 2 ends the information reconciliation process when Steps S27, S28 end, and starts the privacy amplification process.

The information reconciliation process in the transceiver 4 will be described. The public communication unit 35 of the transceiver 4 receives the first correction information ECC (S54). The information processing unit 37 of the transceiver 4 corrects the carried random number $R_1$ so as to approach the first random number $R_0$ using the received first correction information ECC, and generates the corrected random number $R_{1c}$ (S55). The transceiver 4 ends the information reconciliation process when Steps S54, S55 end, and starts the privacy amplification process.

Similarly to the transceiver 4, the information processing units 37 of the transceivers 5, 6 correct the carried random numbers $R_2$, $R_3$ so as to approach the first random number $R_0$ using the received first correction information ECC, and generate the corrected random numbers $R_{2c}$, $R_{3c}$.

The privacy amplification process in the transceiver 2 will be described. The information processing unit 37 of the transceiver 2 calculates the first compression ratio CR from the first leaked information amount $I_{leak}$ received by the public communication unit 35 of the transceiver 2 and the generated first correction information ECC (S29).

The public communication unit 35 of the transceiver 2 transmits the calculated first compression ratio CR to the public communication units 35 of the transceivers 4, 5, 6 (S30).

The information processing unit 37 of the transceiver 2 compresses the first random number $R_0$ by the calculated first compression ratio CR using the hash function, thereby generating the first secret key $K_0$ (S31). The transceiver 2 ends the privacy amplification process when Steps S29 to S31 end, and ends the key distillation process.

The privacy amplification process in the transceiver 4 will be described. The public communication unit 35 of the transceiver 4 receives the calculated first compression ratio CR (S56). The information processing unit 37 of the transceiver 4 compresses the corrected random number $R_{1c}$ by the received first compression ratio CR using the hash function, thereby generating the first secret key $K_0$ (S57). The transceiver 4 ends the privacy amplification process when Steps S56, S57 end, and ends the key distillation process.

Similarly to the transceiver 4, the information processing units 37 of the transceivers 5, 6 compress the corrected random numbers $R_{2c}$, $R_{3c}$ by the received first compression ratio CR using the hash function, thereby generating the first secret key $K_0$.

Figure 6:
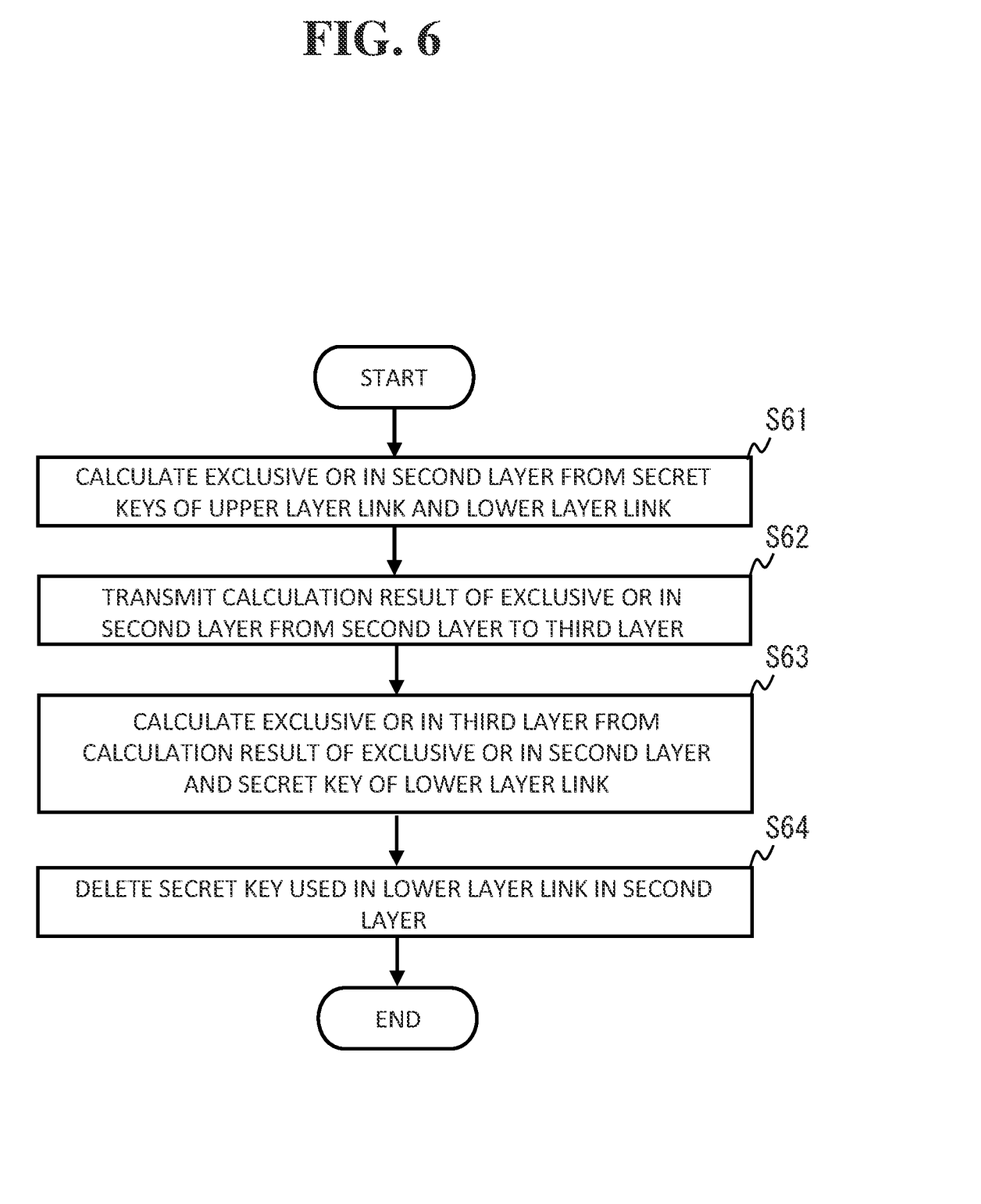
FIG. 6 is a flowchart illustrating a procedure of a key encapsulation relay process according to the embodiment.

Next, with reference to FIG. 6 as a flowchart illustrating a procedure of the key encapsulation relay process according to the embodiment, the key encapsulation relay process will be described. First, the information processing units 37 of the transceivers 4, 5, 6 calculate the calculated value $K_0 \text{XOR} K_1$, $K_0 \text{XOR} K_2$, or $K_0 \text{XOR} K_3$ of the exclusive OR in the second layer from the first secret key $K_0$ of the upper layer link and the second secret key $K_1$, the third secret key $K_2$, or the fourth secret key $K_3$ of the lower layer link (S61).

The public communication units 35 of the transceivers 4, 5, 6 transmit the calculated values $K_0 \text{XOR} K_1$, $K_0 \text{XOR} K_2$, $K_0 \text{XOR} K_3$ of the exclusive OR in the second layer from the second layer to the third layer (S62). For example, the public communication units 35 of the transceivers 9, 14, 19 calculate the first secret key $K_0$ as the exclusive OR in the third layer from the calculated value $K_0 \text{XOR} K_1$, $K_0 \text{XOR} K_2$, or $K_0 \text{XOR} K_3$ of the exclusive OR in the second layer and the second secret key $K_1$, the third secret key $K_2$, or the fourth secret key $K_3$ of the lower layer link (S63). The information processing units 37 of the transceivers 4, 5, 6, 9 delete the second secret key $K_1$, the third secret key $K_2$, and the fourth secret key $K_3$ used by the lower layer link in the second layer (S64).

As described above, since the secret key sharing system 1 according to the embodiment performs the key distillation process in each layer of the upper layer link, the lower layer link, and the like, the second compression ratio CR and the like in the lower layer do not become small compared with the first compression ratio CR in the upper layer. Therefore, the load is approximately uniformly applied to each node of the transceivers 2, 4 to 6, 9 to 11, 14 to 16, 19 to 21, and the like, and it can be said that the secret key sharing system 1 according to the embodiment has the efficiency.

The reason for the efficiency provided to the secret key sharing system 1 according to the embodiment also includes that the calculation amount is small because the key encapsulation relay process is performed with the one-time pad cipher using the exclusive OR.

Since the carrier wave having the directionality and flared to some extent is used, for example, the reason for the efficiency provided to the secret key sharing system 1 according to the embodiment also includes that the transceiver 2 can communicate with a plurality of transceivers, such as the transceivers 9 to 11.

In the secret key sharing system 1 according to the embodiment, the first random number $R_0$ as the base of the first secret key $K_0$ shared among the nodes is carried by the directional carrier wave, and the key distillation process is performed. In view of this, it can be said that the information-theoretic security is provided.

The secret key sharing system 1 according to the embodiment only encapsulates the first secret key $K_0$ using the operation by the exclusive OR in each of the layers such as the upper layer link and the lower layer link.

Therefore, the control procedure is simple, and it can be said that the scalability is provided. It is easy to newly add a transceiver 40 and transceivers 42 to 44 forming a group 41 after the first secret key $K_0$ is shared by the transceivers 2, 4 to 6, 9 to 11, 14 to 16, and 19 to 21 like the second phase illustrated in FIG. 4.

Figure 7:
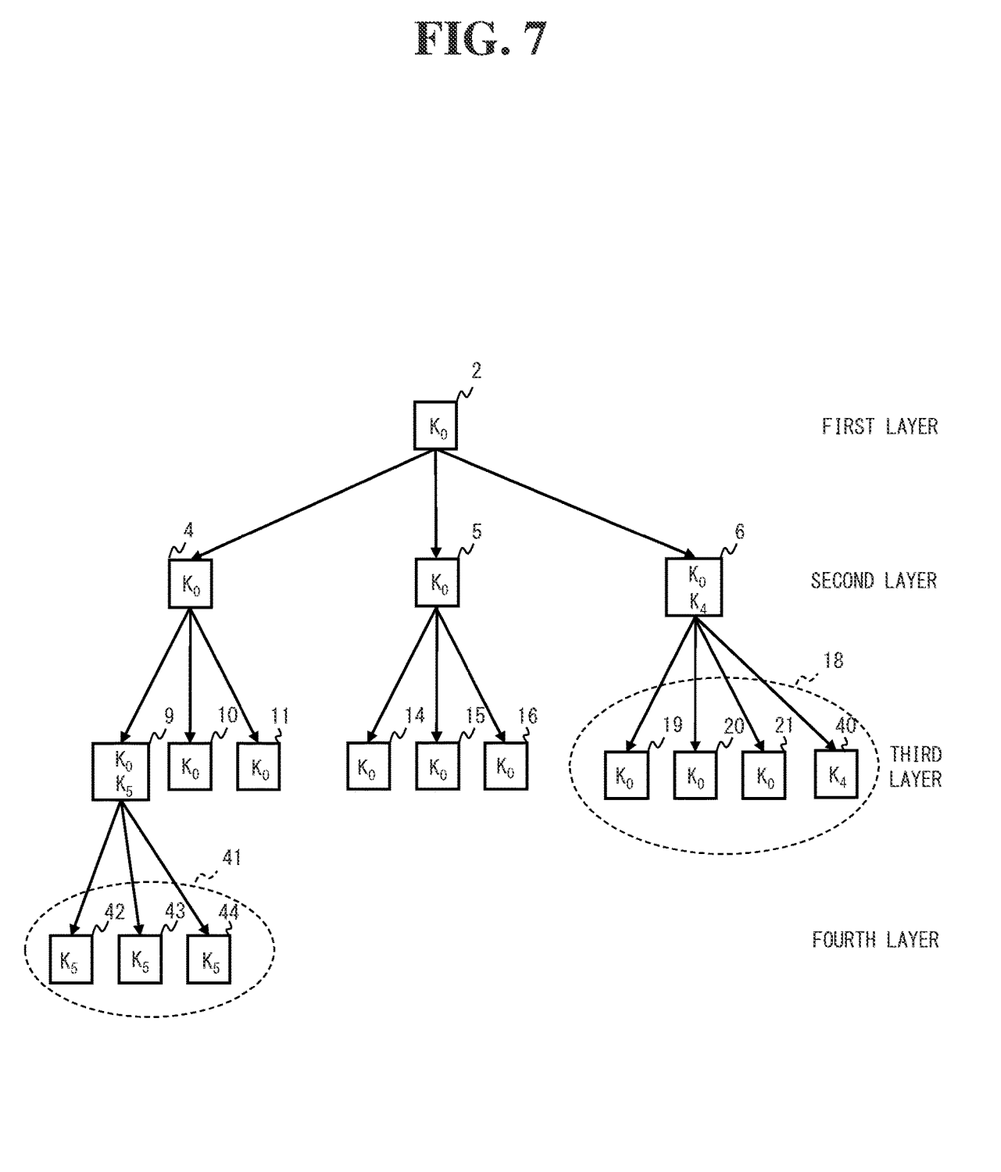
FIG. 7 is a drawing illustrating a case of adding transceivers in the embodiment.

A description will be given by referring to FIG. 7 as a drawing illustrating a case of adding the transceivers 40, 42 to 44 in the embodiment. For example, in the case of adding the transceiver 40, the transceiver 40 does not need to communicate with the transceiver 2, but communicates with the transceiver 6 to share a fifth secret key $K_4$ with the transceiver 6, and then, shares the first secret key $K_0$ with each node of the secret key sharing system 1 using the operation by the exclusive OR.

Similarly to the transceiver 40, the transceivers 42 to 44 forming the group 41 in a fourth layer share a sixth secret key $K_5$ with the transceiver 9, and then, share the first secret key $K_0$ with each node of the secret key sharing system 1 using the operation by the exclusive OR. Thus, the secret key sharing system 1 according to the embodiment has the scalability, and also has an ad-hoc property of facilitating the addition of the transceiver 40 and the group 41.

While the example in which the nodes constituting the secret key sharing system 1 are each a transceiver is described in the embodiment, the embodiment is not limited thereto. For example, the transceiver 2 may be a large aircraft flying in the stratosphere, the transceivers 4 to 6 may be flying objects such as drones flying in a zone near the ground, and the transceivers 9 to 11, 14 to 16, 19 to 21 may be ground stations installed on the ground.

While the case where the random number generation unit 31 and the information processing unit 37 are implemented as an integrated circuit or the like is described in the embodiment, the embodiment is not limited thereto. For example, each of the random number generation unit 31, the modulation unit 32, the demodulation unit 33, and the information processing unit 37 may be a program stored in a storage device, such as a Solid State Drive (SSD), a Hard Disk Drive (HDD), and a Random Access Memory (RAM).

In this case, the process of each unit is performed by reading the program by a Central Processing Unit (CPU).

While the case where the transceiver 2 as the transmitting side generates the first correction information ECC is described in the embodiment, the embodiment is not limited thereto. For example, the first correction information ECC may be generated by a predetermined one transceiver of the plurality of transceivers in the second layer.

For example, assume that the predetermined one transceiver of the plurality of transceivers in the second layer is the transceiver 4. In this case, the first correction information ECC is transmitted from the transceiver 4 to the transceivers 5, 6 as others of the plurality of transceivers in the second layer and the transceiver 2 in the first layer.

The same applies to the second correction information ECC' as the first correction information ECC. The second correction information ECC' is transmitted from a predetermined one transceiver, such as the transceiver 9, of the plurality of transceivers in the third layer to the transceivers 10, 11 as others of the plurality of transceivers in the third layer and the transceiver 4 as the one of the plurality of transceivers in the second.

While the communication between the transceivers 4 to 6 via the public communication path is not specifically described in the embodiment, the communication between the transceivers 4 to 6 via the public communication path may be performed in the embodiment.

While the case where the public communication unit 35 is a Very High Frequency (VHF) communication device, an Ultra High Frequency (UHF) communication device, or the like is described in the embodiment, the embodiment is not limited thereto. For example, the public communication unit 35 may be a Free Space Optics (FSO) device, a Visible Light Communication (VLC) device, or the like.

While the case where the monitoring unit 36 is a monitoring camera or the like is described in the embodiment, the embodiment is not limited thereto. For example, the monitoring unit 36 may be a device for monitoring the peripheral area by a radar or a lidar.

The secret key sharing system 1 according to the embodiment is assumed to be, for example, used in an area where the infrastructure is not organized, used in a production system in a plant including an illumination, a robot, and a sensor, and used in rescue by a rescue team.

DESCRIPTION OF REFERENCE SIGNS

1: Secret key sharing system
2, 4, 5, 6, 9, 10, 11, 14, 15, 16, 19, 20, 21, 30, 40, 42, 43, 44: Transceiver
31: Random number generation unit
32: Modulation unit
33: Demodulation unit
34: Directional carrier wave communication unit
35: Public communication unit
36: Monitoring unit
37: Information processing unit

The invention claimed is:

1. A secret key sharing system comprising:
a transceiver in a first layer;
a plurality of transceivers in a second layer that receive a first random number from the transceiver in the first layer via a directional carrier wave; and
a plurality of transceivers in a third layer that receive a second random number from one transceiver of the plurality of transceivers in the second layer via the carrier wave, wherein the transceiver in the first layer and the plurality of transceivers in the second layer share a first secret key based on the first random number, and the one transceiver of the plurality of transceivers in the second layer and the plurality of transceivers in the third layer share a second secret key based on the second random number, the plurality of transceivers in the third layer receive a calculated value by an exclusive OR of the first secret key and the second secret key from the one transceiver of the plurality of transceivers in the second layer via a public communication path as a communication path open to the public, and calculate the first secret key by obtaining an exclusive OR of the received calculated value and the second secret key, and the first secret key and the second secret key are generated by respectively referring to a first bit error rate and a second bit error rate of the first random number and the second random number carried via the carrier wave, a first leaked information amount and a second leaked information amount, first correction information and second correction information, and a first compression ratio and a second compression ratio, the first bit error rate and the second bit error rate are transmitted and received via the public communication path, the first leaked information amount and the second leaked information amount are amounts of the first random number and the second random number leaked from the carrier wave, the first correction information and the second correction information are for correcting errors of the first random number and the second random number carried via the carrier wave, and the first compression ratio and the second compression ratio are ratios for compressing the first random number and the second random number.

2. The secret key sharing system according to claim 1, wherein
the transceiver in the first layer and the plurality of transceivers in the second layer each include a monitoring unit that monitors in a predetermined range, and the first leaked information amount is calculated by an out-of-range transceiver provided outside the range monitored by each of the monitoring units.

3. The secret key sharing system according to claim 1, wherein
the first correction information is transmitted from the transceiver in the first layer to the plurality of transceivers in the second layer, and the second correction information is transmitted from the one transceiver of the plurality of transceivers in the second layer to the plurality of transceivers in the third layer.

4. The secret key sharing system according to claim 1, wherein
the first correction information is transmitted from a predetermined one transceiver of the plurality of transceivers in the second layer to others of the plurality of transceivers in the second layer and the transceiver in the first layer, and the second correction information is transmitted from a predetermined one transceiver of the plurality of transceivers in the third layer to others of the plurality of transceivers in the third layer and the one transceiver of the plurality of transceivers in the second layer.

5. A secret key sharing method comprising:
a key distillation step including: a parameter estimation step of calculating a first bit error rate and a second bit error rate and a first leaked information amount and a second leaked information amount, the first bit error rate and the second bit error rate being bit error rates of a first random number in a first layer and a second random number in a second layer carried via a directional carrier wave, the first leaked information amount and the second leaked information amount being amounts of the first random number and the second random number leaked from the carrier wave; an information reconciliation step of generating first correction information and second correction information for correcting errors of the first random number and the second random number carried via the carrier wave and correcting the first random number and the second random number carried via the carrier wave by the first correction information and the second correction information; and a privacy amplification step of compressing the first random number and the second random number carried via the carrier wave, the key distillation step generating a first secret key and a second secret key from the first random number and the second random number carried via the carrier wave; and a key encapsulation relay step of receiving a calculated value by an exclusive OR of the first secret key and the second secret key via a public communication path as a communication path open to the public, and calculating the first secret key by obtaining an exclusive OR of the received calculated value and the second secret key in the second layer.

\* \* \* \* \*